Oct. 31, 1950
J. L. BROCK
2,527,982
PENDULUM LEVEL INDICATOR
Filed March 26, 1948
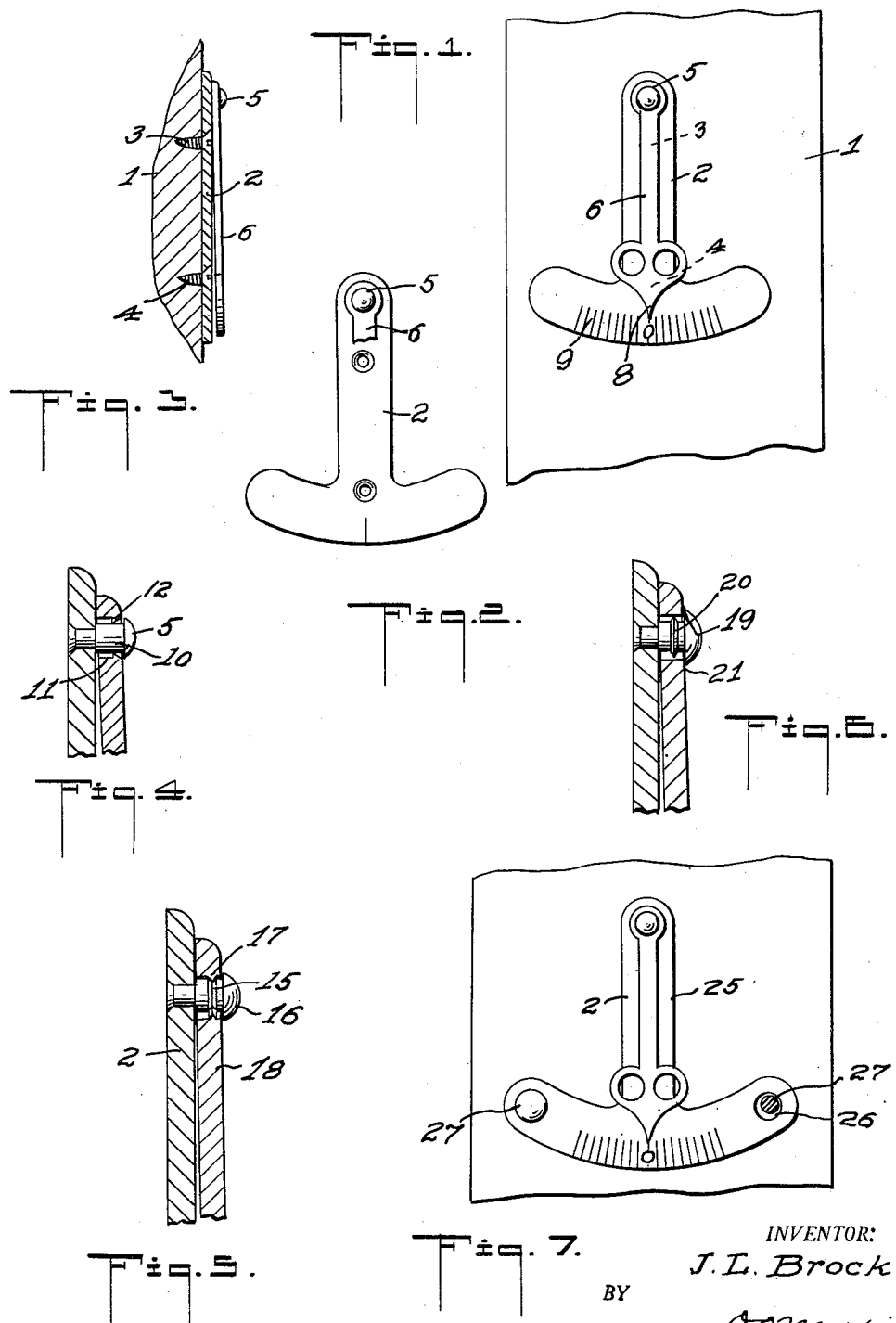
INVENTOR:
J. L. Brock
BY
O O Martin
ATTORNEY.

Patented Oct. 31, 1950

2,527,982

UNITED STATES PATENT OFFICE 2,527,982

PENDULUM LEVEL INDICATOR

Joseph L. Brock, El Monte, Calif.

Application March 26, 1948, Serial No. 17,251

2 Claims. (Cl. 33—215)

This invention relates to a device for indicating variations in the position of a structure which, in the first instance, has been set up and correctly adjusted vertically as well as horizontally. While the device of the invention may be found useful for many purposes, it is particularly adapted for use in connection with house trailers. When such vehicles are jacked up, or otherwise set up in permanent position, it is quite important that it is correctly adjusted both vertically and horizontally so that various fixtures used in such vehicles, as for example, water basins and fuel tanks, are properly leveled. It is equally important to provide means for checking the position of such structure in order that any variation thereof, due to settling of the wheels or other foundation parts of the structure be recorded so as to enable the occupant to make the necessary adjustments.

With these conditions in view, it is the object of the present invention to provide a simple and inexpensive device which may be placed within such structure in a conspicuous place and which will indicate any slight variation of the position of the structure, both horizontally and vertically.

With these and other objects in view, the invention recites in the combinations hereinafter described in detail, and illustrated in the accompanying drawings, of which:

Fig. 1 is a fragmentary view of a stud or other structural member of a trailer, showing the method of applying the device of the invention thereto;

Figs. 2 and 3 are respectively front and side elevational views of the device of the invention as it appears when removed from its support;

Figs. 4, 5 and 6 are detail views, on a much larger scale, showing the improved method of assembling the component parts of the device; and Fig. 7 shows a modified means of mounting the device.

In Fig. 1, the numeral 1 denotes a stud or other frame member of a structure such as a house trailer and device of the invention is shown mounted on both the face and one of the side surfaces of this member. The device includes an elongated base 2, which is perforated to receive screws 3, 4 by means of which the device is fastened to its support. A stud 5 projects from the face of the support, at the upper end thereof, pivotally to support an indicator in the form of a pendulum 6, the lower end of which is pointed, as indicated at 8, to register with graduations of a scale 9 of the backing 2, or merely a central plumb line as in Fig. 2.

As above stated, the structure, in this case a trailer, is in the first instance jacked up and adjusted to correct horizontal and vertical position, whereupon the indicator of my invention is mounted on its support in the following manner. The screw 3 is first entered through the upper perforation of the backing and screwed into position on the support, whereupon the backing is swung on this screw until the point of the pendulum registers with the zero graduation of the scale. The screw 4 may then be placed to maintain the backing rigidly in this position. It is important to note that the perforation for the screws must be countersunk sufficiently to cause the screw heads to seat slightly below the surface of the backing.

It is understood, of course, that two indicators should be provided at right angles to each other, substantially as indicated in Fig. 1, in order that variations in the position of the structure in any direction may be recorded. But while I have in the drawings shown the indicator aplied to two sides of the stud or other vertical member of the trailer, it is to be understood that it may be applied to the inner side walls and end walls of the trailer or to any other part thereof which may be found suitable for the purposes of the invention.

The manner of mounting the pendulum on the backing of the indicator is very important in order that the pendulum may always operate freely on the backing without danger of friction between the pendulum and the backing checking the oscillating movement of the pendulum. For this purpose I have shown the pendulum and the stud on which it rides so shaped and constructed that the pendulum will normally be held swung away a short distance from the face of the backing. This may be done in various ways. As indicated in Fig. 4 the stud 5 is made with a straight shoulder portion 10 on which the pendulum rides and it is noticed that the inner end 11 of the perforation through the pendulum is enlarged sufficiently, so that it will not come in contact with the shoulder of the stud. The outer end of the pendulum perforation is first bored to fit the shoulder of the stud snugly, whereupon a tapered reamer is applied from the outside of the pendulum slightly to bevel the outer portion of this perforation and so to provide an inner sharp edge 12 which rides along on the shoulder of the stud. The edge 12 should be nearer the outer face of the pendulum in order that the weight of the pendulum suspended therefrom will tend to swing the lower end of the pendulum outward, as indicated in Fig. 3. When the mounting is effected in this manner it is found that the pendulum will be free to swing on the stud correctly to register any slight variation in the mounting of the vehicle so to surely enable the occupant to effect the necessary adjustment thereof.

A modification of the method of mounting the pendulum on the stud is in Fig. 5 shown to include a groove 15 in the shoulder of the stud 16, in which an annular ridge 17 of the pendulum 18 is fitted to ride. This ridge should be large enough in diameter to allow the pendulum to swing freely on the stud and it should, of course, be near the outer surface of the pendulum so that gravity will tend to swing the pendulum outwardly, as indicated in Fig. 3.

As a further modification, the stud 19 is in Fig. 6 shown made with an annular ridge 20 projecting therefrom on which the pendulum rides. In this case, it is merely required to provide a straight perforation 21 through the pendulum slightly larger in diameter than the ridge 20 in order that the pendulum may be free to swing thereon.

The studs of trailer and other building structures are taken from coarse grained wood through which hard fibres irregularly run. When the occupant of the trailer, or other workman commences to mount the device in position, it will often be found that the fastening screws, unless both screws should happen to register with the soft pulp of the wood, will be forced to one side by the hard fibres and that the devices for this reason will be out of plumb. In order to insure against such misplacement, I have found it necessary somewhat to modify the device.

Such modification is shown in Fig. 7 to consist in providing in the bottom position of the indicator backing 25, perforations 26 which are somewhat larger in diameter than the screws 27 to be entered therethrough for the purpose of mounting the backing on its support. In this case, straight holes are cut through the backing and round head screws employed. In mounting the device, care is taken to have the pendulum pointer register with the zero mark of the scale. If then the screws are forced slightly out of line as they advance into the wood, it is merely required to swing the backing into proper registration as the screws are forced tightly against the backing. When the device is mountable in such manner, it is seen that the countersunk holes of the backing 2 may be omitted.

While in the foregoing I have described preferred forms of the invention, it is not intended thereby to limit the scope of utility thereof, but further modifications may be embodied within the scope of the claims hereto appended.

I claim:

1. The combination with a support, of a level indicator mountable on said support comprising, a backing having a perforation at the upper end thereof, and an arcuate graduated scale at the bottom concentric with said perforation, a stud seated in said perforation and outwardly projecting therefrom, a pendulum having a perforation at the upper end thereof of a size freely to ride on said stud, the inner portion of said perforation being enlarged to clear the stud in all positions taken by the pendulum thereon, the outer end of said perforation being slightly countersunk to form an annular ridge nearer the outer face of the pendulum on which the pendulum comes to rest on the stud, and means for mounting said backing on the support.

2. A level indicator comprising, a backing having a perforation at the upper end thereof, and an arcuate graduated scale at the bottom concentric with said perforation, a stud seated in said perforation and outwardly projecting therefrom, said stud being made with a head at the outer end thereof and having an annular substantially V-shaped groove cut in the surface thereof, the center of said groove being nearer the head of the stud, a pendulum perforated at its upper end to ride on said stud and terminating at the bottom in a pointer registering with said scale, the perforation of the pendulum having an annular ridge inwardly projecting therefrom to ride in the groove of the stud, said ridge being nearer the outer face of the pendulum.

JOSEPH L. BROCK.

REFERENCES CITED

The following references are of record in the file of this patent:

UNITED STATES PATENTS

| Number | Name | Date |
|---|---|---|
| 790,813 | Auld | May 23, 1905 |
| 834,964 | Broderick | Nov. 6, 1906 |
| 896,483 | Thies | Aug. 18, 1908 |
| 981,832 | Bader | Jan. 17, 1911 |
| 1,123,269 | Frame | Jan. 5, 1915 |
| 1,124,984 | White | Jan. 12, 1915 |
| 1,539,262 | McAleish | May 26, 1925 |
| 2,384,100 | Knudsen | Sept. 4, 1945 |